Oct. 23, 1951      C. B. OAS ET AL      2,572,374
MACHINE FOR SANDING BROOM HANDLES
Filed May 11, 1949      2 SHEETS—SHEET 1
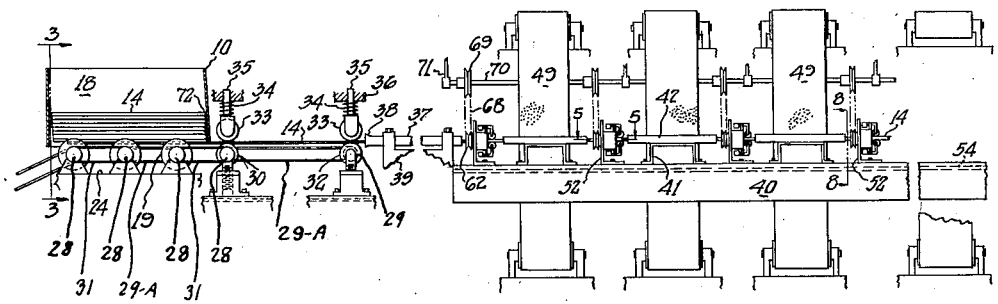
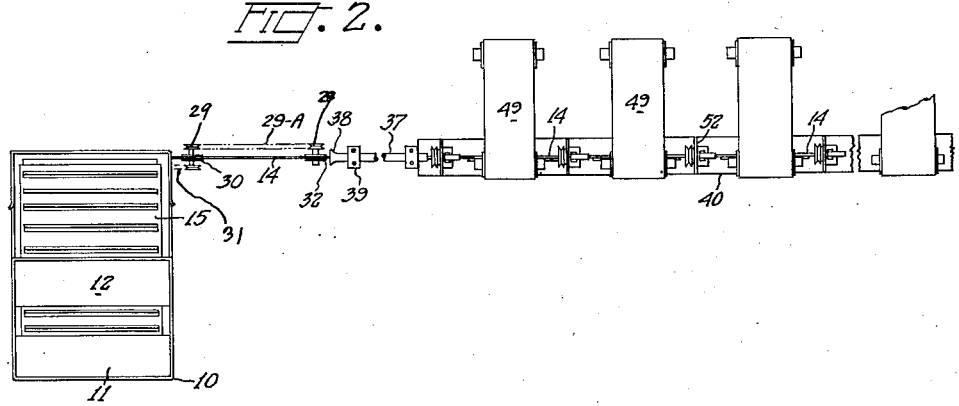
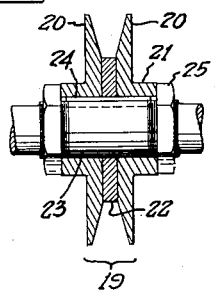
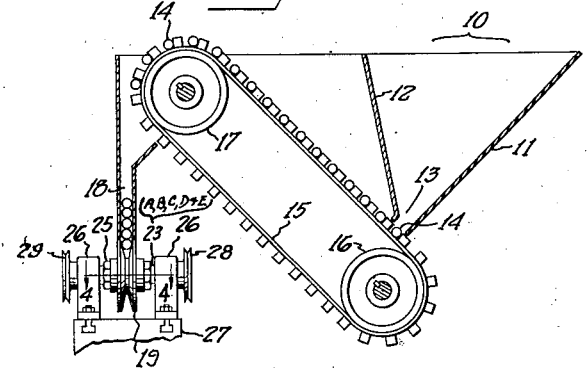
INVENTORS
CARL B. OAS
CHARLES H. LEONARD
BY
ATTORNEY Oct. 23, 1951     C. B. OAS ET AL     2,572,374
MACHINE FOR SANDING BROOM HANDLES
Filed May 11, 1949     2 SHEETS—SHEET 2
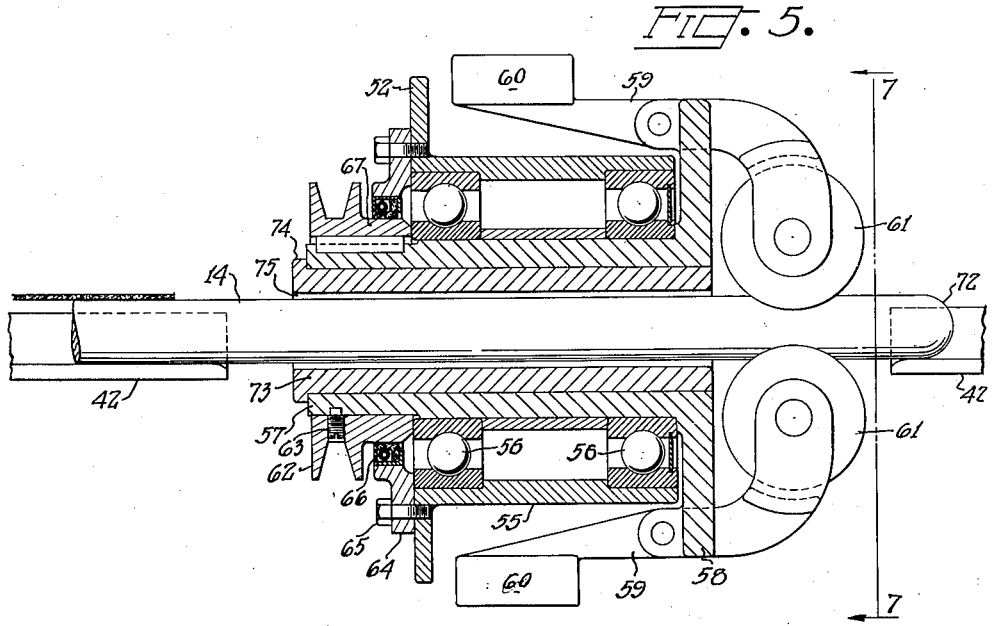
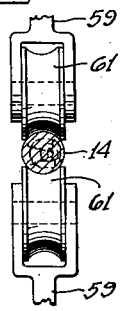
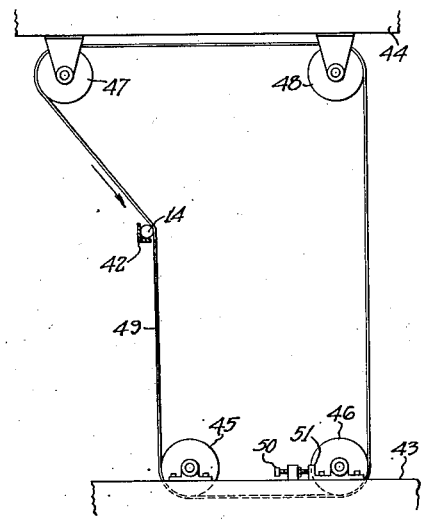
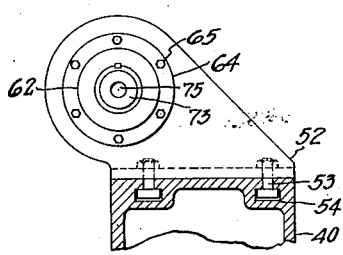
INVENTORS
CARL B. OAS
CHARLES H. LEONARD
BY
ATTORNEY Patented Oct. 23, 1951

2,572,374

UNITED STATES PATENT OFFICE 2,572,374

MACHINE FOR SANDING BROOM HANDLES

Carl B. Oas, Girard, Pa., and Charles H. Leonard, Silverton, Oreg.

Application May 11, 1949, Serial No. 92,704

1 Claim. (Cl. 51—139)

This invention relates generally to woodworking machinery and particularly to a machine for sanding broom handles.

The main object of this invention is to construct a machine whereby broom handle blanks may be sanded with a series of abrasive belts of increasing fineness in order to obtain a very smooth finish in the shortest possible time.

The second object is to reduce the amount of hand labor required in the manufacture of broom handles and thereby reduce the cost to the consumer.

These and other objects will become more apparent from the specifications following as illustrated in the accompanying drawings, in which:

Fig. 1 is a side elevation of the machine with the hopper for broom handles shown in vertical section.

Fig. 2 is a plan view of Fig. 1.

Fig. 3 is a vertical section taken along the line 3—3 in Fig. 1.

Fig. 4 is an enlarged section taken along the line 4—4 in Fig. 3.

Fig. 5 is an enlarged section along the line 5—5 in Fig. 1.

Fig. 6 is an end elevation of a belt sanding unit.

Fig. 7 is a section taken along the line 7—7 in Fig. 5.

Fig. 8 is a section taken along the line 8—8 in Fig. 1.

Like numbers of reference refer to the same or similar parts throughout the several views.

Referring in detail to the drawings, there is shown a hopper 10 whose back wall 11 and front wall 12 converge to form an outlet 13 through which broom handle blanks 14 are fed onto a cleated conveyor belt 15 which passes around the pulleys 16 and 17 which may be driven in any convenient manner (not shown).

The conveyor belt 15 discharges the handle blanks 14 one at a time into the vertical chute 18, under which are mounted a plurality of grooved hopper wheels 19 which consist of two halves or flanges 20 formed on the hubs 21 between which is a spacing collar 22 which, together with the hubs 21, are held on the shafts 23 by means of the keys 24. The shafts 23 are threaded to receive the nuts 25, by means of which the flanges 20 are clamped against the collar 22. The collar width is changed to suit the handle diameter.

One shaft 23 journals in the standards 26 which are mounted on the slotted base 27 to provide adjustability between the centers of the shafts 23. On the outer ends of the shafts 23 are secured the V-pulleys 28 and 29, by the latter of which each shaft 23 is driven and by the former of which the shaft 23 drives the next shaft 23 ahead. One shaft 23 has only the V-pulley 29.

In front of the wheels 19 is the feed roll 30 which is driven by a belt 31 from a hopper pulley 28 and which in turn drives the pulley 32. The pulleys 30 and 32 are grooved to receive the handle blanks 14. The pulleys 29 are connected by the belt 29-A.

On the top side of the blank 14 are placed the presser feed rolls 33 which are urged downwardly by the springs 34. The slides 35 which carry the rolls 33 are mounted in the guides 36.

A guide tube 37 receives the handle blanks 14 from the rolls 32 and 33. The tube 37 is flared at its intake end 38. A bracket 39 supports the tube 37. Along the frame 40 are disposed a plurality of standards 41, upon which are secured the angle bars 42 which support the handle blanks 14 while being sanded. The length of the bars 42 and the spacing thereof depends upon the length of the blanks 14.

Supported by the frames 43 and 44 are the pulleys 45, 46, 47 and 48, around which passes an abrasive belt 49 which engages a handle 14 as it turns in the bar 42 between the pulleys 45 and 47. The pulley 46 is provided with an adjusting screw 50 which positions the pulley base 51 for belt tightening purposes.

Between the ends of the bars 42 are disposed the driving units which impart a rotary motion to the handle blanks 14. On the frame 40 are secured slidable bases 52 by means of the bolts 53 in the T slots 54.

On each base 52 is formed a housing 55 which contains the anti-friction bearings 56 within whose inner race is disposed a sleeve 57 having a flange 58 at one end, on which are pivoted the levers 59, each of which has a weight 60 at one end and a grooved roller 61 at the other end. The rollers 61 engage the handle blank 14 from opposite sides.

A grooved pulley 62 is secured on each sleeve 57 by means of a setscrew 63.

A bearing retaining flange 64 is secured to the base 52 by means of the bolts 65. An oil retaining seal 66 is placed between the flange 64 and the hub 67 of the pulley 62.

The pulleys 62 are driven by belts 68 which are driven by the pulleys 69 on the drive shaft 70 which journals in the bearings 71. The shaft 70 is driven by any suitable means (not shown).

The operation of the machine is as follows: Blanks 14 are placed in the hopper 10 and fed by the conveyor belt 15 to the chute 18 from which they depend by gravity upon the grooved hopper wheels 19 whose flanges 20 move the lowermost blank 14 horizontally between the feed rolls 30 and 32 and the presser rolls 33, causing the rounded end 72 of the blank 14 to enter the tube 37 and to be forced therethrough. Up to this point, the blank 14 is not being rotated.

The tube 37 merely directs or guides the blanks 14 as they leave the rolls 32 and 33 into the first rotating unit shown in Fig. 5. Each of these units is fitted with a sleeve 73 having a flange 74 on one end and a central hole 75 which freely receives the blank 14 whose end 72 passes between the rollers 61 which are urged inwardly by the centrifugal action of the weights 60 as they are revolved by the belt 68. The friction between the rollers 61 and blank 14 and the rotation of the sleeve 73 imparts a rotating movement to the blank 14.

As the blank 14 moves past the bar 42, it engages the first abrasive belt 49 which carries the coarsest grit and then through the next drive unit. Each succeeding belt 49 carries a finer grit so that the rough sanding is done first and the finer sanding is done last. It will be noted that the sanding is continuous and that the blanks feed each other past the various sanding belts.

What we claim is:

1. A sanding machine for round, straight broom handles having in combination a set of V-shaped feed rolls in which the rough turned handles may be fed longitudinally, a guide tube into which handle blanks may be fed by said feed rolls, a plurality of V-shaped trough members disposed in alignment with said guide tube and feed rolls and spaced from each other and from said guide tube, a sand belt intersecting each of said troughs adapted to engage the surface of a handle passing therethrough, a driving unit between each pair of troughs having an opening therethrough, through which a handle may freely pass, means for rotating each of said units, a pair of grooved rollers mounted on each driving unit, each of said rollers having means for urging same toward the center of said unit, a longitudinal movement of said handle being provided by the initial feed rolls and the rotation of said handles through said machine being produced by the rotation of said driving units.

CARL B. OAS.
CHARLES H. LEONARD.

REFERENCES CITED

The following references are of record in the file of this patent:

UNITED STATES PATENTS

| Number | Name | Date |
|---|---|---|
| 437,911 | Abbott | Oct. 7, 1890 |
| 759,187 | Ober | May 3, 1904 |
| 1,198,136 | Ladd | Sept. 12, 1916 |
| 1,570,684 | Kuhn et al. | Jan. 26, 1926 |
| 1,611,418 | Clipsham | Dec. 21, 1926 |
| 1,823,625 | Nash | Sept. 15, 1931 |
| 2,397,459 | Armbrust | Apr. 2, 1946 |